(12) United States Patent
Hulse et al.

(10) Patent No.: US 8,815,058 B2
(45) Date of Patent: Aug. 26, 2014

(54) EXTRACTIVE DISTILLATION OF $ASF_5$ AND $PF_5$ USING HF

(75) Inventors: Ryan J. Hulse, Getzville, NY (US); Bernie E. Pointner, Buffalo, NY (US)

(73) Assignee: Honeywell International Inc., Morristown, NJ (US)

( * ) Notice: Subject to any disclaimer, the term of this patent is extended or adjusted under 35 U.S.C. 154(b) by 518 days.

(21) Appl. No.: 13/097,745

(22) Filed: Apr. 29, 2011

(65) Prior Publication Data

US 2012/0003137 A1 Jan. 5, 2012

Related U.S. Application Data

(60) Provisional application No. 61/360,160, filed on Jun. 30, 2010.

(51) Int. Cl.
*B01D 3/40* (2006.01)
*C01B 25/10* (2006.01)
*C01B 25/455* (2006.01)

(52) U.S. Cl.
USPC .............. 203/50; 423/301; 423/462; 423/483

(58) Field of Classification Search
USPC ................... 203/50; 423/301, 462, 483, 489
See application file for complete search history.

(56) References Cited

U.S. PATENT DOCUMENTS

| | | | |
|---|---|---|---|
| 4,668,497 A * | 5/1987 | Miki | 423/484 |
| 5,100,639 A | 3/1992 | Freire et al. | |
| 6,645,451 B1 * | 11/2003 | Schulz et al. | 423/301 |
| 8,308,850 B2 * | 11/2012 | Olschimke et al. | 95/233 |
| 2001/0022957 A1 * | 9/2001 | Subbanna et al. | 423/484 |
| 2002/0001553 A1 | 1/2002 | Bulan | |
| 2002/0063052 A1 * | 5/2002 | Peters et al. | 203/31 |
| 2011/0021803 A1 | 1/2011 | Jin et al. | |

FOREIGN PATENT DOCUMENTS

JP 2003-238161 A 8/2003

* cited by examiner

*Primary Examiner* — Virginia Manoharan
(74) *Attorney, Agent, or Firm* — Carrie Beatus

(57) ABSTRACT

Arsenic can be an impurity in phosphorous pentafluoride production processes. It is desirable to remove arsenic from phosphorous pentafluoride prior to using of the phosphorous pentafluoride in the production of lithium hexafluorophosphate. The present technology provides methods of removing arsenic from phosphorous pentafluoride by extractive distillation.

11 Claims, 1 Drawing Sheet

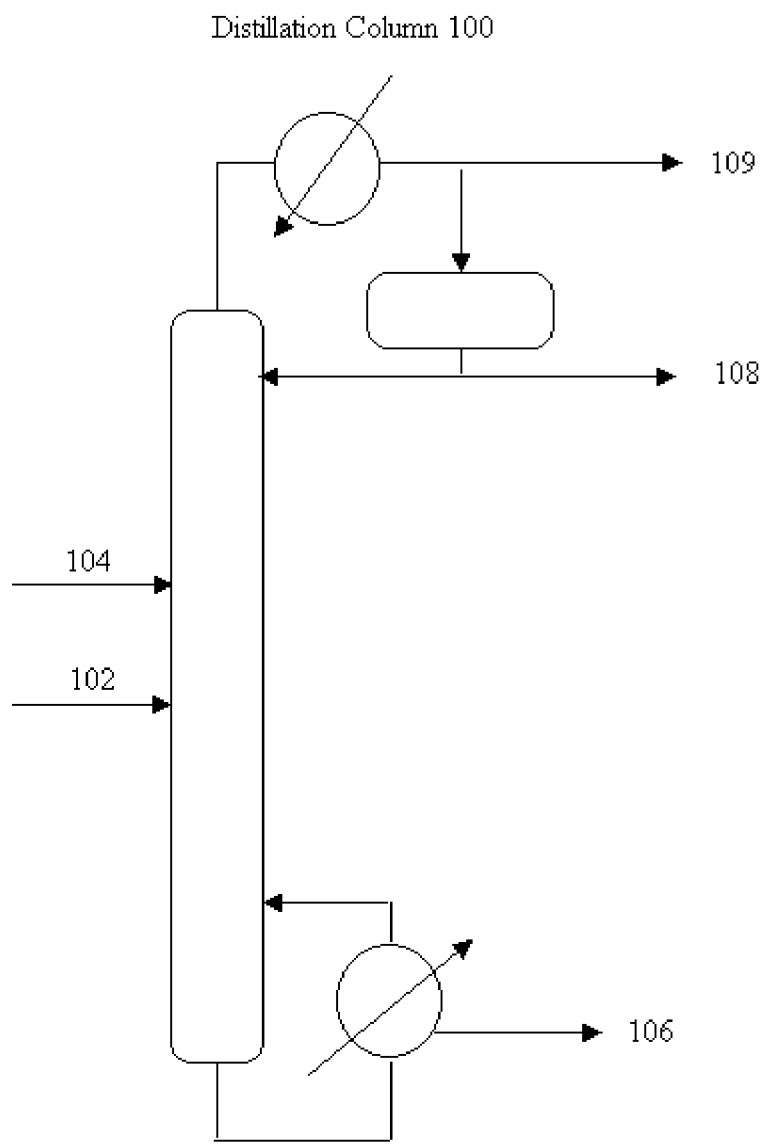

EXTRACTIVE DISTILLATION OF ASF$_5$ AND PF$_5$ USING HF

RELATED APPLICATIONS

This application claims the benefit of U.S. Provisional Application Ser. No. 61/360,160, filed on Jun. 30, 2010.

FIELD OF THE INVENTION

The present technology pertains to purifying phosphorous pentafluoride (PF$_5$) which is a useful intermediate in the production of lithium hexafluorophosphate (LiPF$_6$). More particularly, the invention pertains to the removal of arsenic pentafluoride (AsF$_5$) from PF$_5$ by extractive distillation.

DESCRIPTION OF RELATED ART

LiPF$_6$ is a highly conductive salt used in the electrolyte of a lithium ion battery. A lithium ion battery is made up of an anode which is typically carbon, a cathode made of a metal oxide, a separator and an electrolyte, namely LiPF$_6$. Lithium ion batteries are used in personal electronics such as cell phones and laptop computers as well as in hybrid electric vehicles. Lithium ion batteries are ideal for these applications due to their high energy density. The higher the energy density, the smaller and lighter the battery for a given application. Lithium ion batteries also operate at higher voltage and have a longer shelf life than other common rechargeable batteries.

Typically, LiPF$_6$ is manufactured by using lithium fluoride (LiF) and PF$_5$ as starting materials. One method of producing the PF$_5$ can be carried out by reacting elemental phosphorus (P) and fluorine (F$_2$) as described in U.S. patent application Ser. No. 12/722,390, filed on Mar. 11, 2010. Arsenic (As) is an impurity that can be found in both F$_2$ and P. In the production of PF$_5$ utilizing P and F$_2$ as starting materials, any As present will react to form arsenic pentafluoride (AsF$_5$). If it is not removed from the process, the AsF$_5$ will be converted to lithium hexafluoroarsenate (LiAsF$_6$) when the PF$_5$ is reacted with LiF, and will remain in the LiPF$_6$ end product. Due to the toxicity issues associated with As, having it as an impurity in the end product is not desirable.

SUMMARY OF THE INVENTION

The methods of the present technology relate to removing arsenic containing products, such as AsF$_5$, from a PF$_5$ containing reaction product using an extractant. The extractive distillation method has been shown to significantly reduce (e.g. by 20%, 30%, 40% and 50%) the concentration of AsF$_5$ as compared to other methods of distillation.

In one aspect, a method of removing arsenic from phosphorous pentafluoride by extractive distillation is provided that includes providing a phosphorous pentafluoride feed stream to an extractive distillation column, where the phosphorous pentafluoride feed stream includes phosphorous pentafluoride and arsenic pentafluoride, providing an extractant to the extractive distillation column, and separating arsenic pentafluoride from the phosphorous pentafluoride in the extractive distillation column.

In another aspect, a method of removing arsenic from phosphorous pentafluoride by extractive distillation is provided that includes providing a phosphorous pentafluoride feed stream to an extractive distillation column, the phosphorous pentafluoride feed stream comprising phosphorous pentafluoride and arsenic pentafluoride; providing hydrogen fluoride an extractant to the extractive distillation column; separating arsenic pentafluoride from the phosphorous pentafluoride in the extractive distillation column; and removing purified phosphorous pentafluoride from the extractive distillation column, the purified phosphorous pentafluoride comprising arsenic in an amount less than about 20 ppm, preferably less than about 5 ppm.

BRIEF DESCRIPTION OF THE DRAWINGS

Specific examples have been chosen for purposes of illustration and description, and are shown in the accompanying drawings, forming a part of the specification.

FIG. 1 illustrates one example of an extractive distillation tower of the present technology.

DETAILED DESCRIPTION

In methods of preparing a PF$_5$, reagents can be fluorinated with elemental fluorine. This may be done, for example, by the reaction of phosphorus (P) with fluorine (F$_2$) to yield PF$_5$. Arsenic (As) is an impurity that may be found in sources of both elemental fluorine and phosphorous. When arsenic is present during the production of PF$_5$ it may react with the fluorine to form AsF$_5$, which has proven extremely difficult to remove by standard distillation, in which mixtures can be separated based on differences in their volatilities in a boiling liquid mixture.

At atmospheric pressure, the boiling point of AsF$_5$ is at a temperature of about −52.8° C. and the boiling point of PF$_5$ is at a temperature of about −84.6° C. Given that there is a nearly 32° C. difference between the boiling points of AsF$_5$ and PF$_5$, one would expect that the two components could be separated by standard distillation wherein the AsF$_5$ would collect in the reboiler and the purified PF$_5$ would be collected overhead. However, it has been found that standard distillation is not successful in separating the two components sufficiently. Without being bound by any particular theory, it is believed that the AsF$_5$ can form an azeotrope, or an azeotrope-like composition with PF$_5$, thus increasing the difficulty of purifying PF$_5$.

Azeotropes and azeotrope-like compositions are "constant boiling" or essentially "constant boiling," which means that the composition of the vapor formed during boiling or evaporation (under substantially isobaric conditions) is identical, or substantially identical, to the original liquid composition. Thus, with boiling or evaporation, the proportions of the components in the liquid composition will only change a minimal or negligible amount, such as by about 2% by weight or less, if at all. This is to be contrasted with non-azeotrope-like compositions in which, during boiling or evaporation, the proportions of the components in the liquid composition change to a substantial degree because the component having the lowest boiling point evaporates first and is thus removed from the liquid composition.

In accordance with methods of the present technology, AsF$_5$ can be separated from PF$_5$ by using a separation solvent, or extractant, in an extractive distillation process. The extractant can be used to break the azeotrope, or azeotrope-like composition, and allow the AsF$_5$ to be removed from the PF$_5$. While any suitable extractant may be used, one particularly preferred example is hydrogen fluoride (HF).

FIG. 1 illustrates an extractive distillation column 100. The extractive distillation column 100 may be used to perform batch extractive distillation processes or continuous extractive distillation processes where the distillate can be connected as a liquid, vapor or a combination of liquid and vapor.

Additionally, the extractive distillation column 100 may be used as a single column or may be used with multiple columns operating in series or parallel.

Phosphorous pentafluoride can be provided to the extractive distillation column 100 through a conduit in phosphorous pentafluoride feed stream 102. The $PF_5$ can be supplied from any suitable source, including, for example, a product stream from a $PF_5$ production process that forms $PF_5$ by reacting P with $F_2$. The phosphorous pentafluoride feed stream 102 can include impurities, including arsenic, which can be in the form of $AsF_5$.

The extractant may be provided to the extractive distillation column 100 through a conduit in extractant feed stream 104 or alternatively can be provided directly into the reboiler. The extractant can be provided in any amount suitable to separate the $AsF_5$ from the $PF_5$. For example, when the extractant is HF, the HF can be provided in an amount from about 0.5 wt % to about 10 wt % based on the weight of the total charge of $PF_5$ and HF to the extractive distillation column. In some examples, the HF can be provided to the extractive distillation column 100 in an amount from about 1 wt % to about 3 wt %.

The extractant may be selected to react with the $AsF_5$ in the extractive distillation column 100 to separate the $AsF_5$ from the $PF_5$. For example, when the extractant is HF, the HF can react with the $AsF_5$ to form an extraction product that contains the $AsF_5$, such as $HAsF_6$. A bottoms stream 106, which can include extractant and the extraction product that contains the $AsF_5$, can be removed from the bottom of the extractive distillation column 100 through a conduit. A purified phosphorous pentafluoride stream 108 and/or 109 that includes purified phosphorous pentafluoride can be removed through a conduit as the overhead stream from the top of the extractive distillation column 100. The purified $PF_5$ stream 108 and/or 109 can still include some arsenic, but preferably includes arsenic in an amount less than about 20 ppm (parts per million), including, but not limited to less than about 15 ppm, less than about 10 ppm, less than about 5 ppm. For example, the purified $PF_5$ stream 108 and/or 109 can include arsenic in an amount from about 1 ppm, to about 5 ppm, or preferably from less than about 1 ppm to about 2 ppm, including an amount of about 1 ppm.

The extractive distillation column 100 can be operated at any suitable temperature, including but not limited to from about −40° C. to about 14° C., and preferably at a temperature of about −25° C. The extractive distillation column can also be operated at any suitable pressure, including for example a pressure from about 112 psi to about 527 psi.

EXAMPLE

A distillation column was constructed of Monel™ by Special Metals Corporation. The distillation column included a 1 liter reboiler attached to a column having an internal diameter of about 1 inch (2.5 cm) and a height of about 4 feet (1.22 meters). The column was packed with heli-pak high efficiency packing, available from Wilmad-LabGlass, which was rated at 80 theoretical staged for this design. The column temperature and pressure were controlled by the flow rate of liquid nitrogen to the condenser. Prior to use, the distillation column was passivated with 19% $F_2$/81% $N_2$ at 30 psi and then evacuated to ensure that all organic and inorganic materials had been removed from the column. The column was then evacuated to below 50 mTorr before charging.

The distillation column was charged with a $PF_5$ sample that contained about 300 ppm of $AsF_5$. The temperature of the distillation column was then set to −25° C. After the distillation column had reached equilibrium, an initial vapor sample was taken. The initial vapor sample was bubbled directly into water and then analyzed by inductively coupled plasma spectroscopy (ICP). Operation of the distillation column was then continued at −25° C., and a sample was taken each hour. Each of the samples was bubbled directly into water and then analyzed by ICP. The results of the testing are in table 1 below.

TABLE 1

| Sample # | Temp, ° C. Overhead | Pressure (psig) | Sample Collected (gm) | ICP As (ppm) | AsF5 (ppm) |
|---|---|---|---|---|---|
| 1 | −25.0 | 164.4 | 27.7 | 56.8 | 129 |
| 2 | −25.0 | 164.8 | 9.7 | 27.1 | 61 |
| 3 | −24.9 | 165.2 | 12.4 | 26.9 | 61 |
| 4 | −25.2 | 165.3 | 4.1 | 9.7 | 22 |
| 5 | −25.0 | 165.1 | 10.7 | 11.9 | 27 |
| 6 | −25.0 | 164.7 | 7.6 | 8.4 | 19 |
| | | Added HF | | | |
| 7 | −25.0 | 164.4 | 9.2 | 8.1 | 18 |
| 8 | −25.0 | 164.3 | 7.7 | 5.1 | 12 |

The initial concentration of $AsF_5$ was about 129 ppm. After a period of about 6 hours, the concentration of $AsF_5$ leveled off at about 19 ppm. HF was then added to the distillation column as an extractant in an amount of about 3 wt % of the overall charge, which was about 12.25 gm of HF. The HF was added directly to the reboiler of the distillation column. After adding the HF, the $AsF_5$ concentrations fell to about 12 ppm over a two hour period.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A method of removing arsenic from phosphorous pentafluoride by extractive distillation, the method comprising:
    charging a phosphorous pentafluoride feed stream to an extractive distillation column, the phosphorous pentafluoride feed stream comprising phosphorous pentafluoride and arsenic pentafluoride;
    charging hydrogen fluoride as a separation solvent to the extractive distillation column in an amount from about 0.5 wt % to about 10 wt % based on the weight of the total charge of phosphorous pentafluoride and hydrogen fluoride to the extractive distillation column; and
    separating arsenic pentafluoride from the purified phosphorous pentafluoride in the extractive distillation column.

2. The method of claim 1, wherein the hydrogen fluoride is charged to the extractive distillation column in an amount from about 1 wt % to about 3 wt % based on the weight of the total charge of phosphorous pentafluoride and hydrogen fluoride to the extractive distillation column.

3. The method of claim 1, wherein the purified phosphorous pentafluoride comprises arsenic in an amount from about 1 ppm to about 5 ppm.

4. The method of claim 1, wherein the purified phosphorous pentafluoride comprises arsenic in an amount from about 1 ppm to about 2 ppm.

5. The method of claim 1, wherein the extractive distillation column is operated at a temperature from about −40° C. to about 14° C.

6. The method of claim 1, further comprising the step of:
removing the purified phosphorous pentafluoride from the extractive distillation column.

7. A method of removing arsenic from phosphorous pentafluoride by extractive distillation, the method comprising:
charging a phosphorous pentafluoride feed stream to an extractive distillation column, the phosphorous pentafluoride feed stream comprising phosphorous pentafluoride and arsenic pentafluoride;
charging hydrogen fluoride as a separating solvent to the extractive distillation column;
separating arsenic pentafluoride from the phosphorous pentafluoride in the extractive distillation column; and
removing purified phosphorous pentafluoride from the extractive distillation column, the purified phosphorous pentafluoride comprising arsenic in an amount from about 1 ppm to about 5 ppm.

8. The method of claim 7, wherein the hydrogen fluoride is charged to the extractive distillation column in an amount from about 0.5 wt % to about 10 wt % based on the weight of the total charge of phosphorous pentafluoride and hydrogen fluoride to the extractive distillation column.

9. The method of claim 8, wherein the hydrogen fluoride is charged to the extractive distillation column in an amount from about 1 wt % to about 3 wt % based on the weight of the total charge of phosphorous pentafluoride and hydrogen fluoride to the extractive distillation column.

10. The method of claim 7, wherein the purified phosphorous pentafluoride comprises arsenic in an amount from about 1 ppm to about 2 ppm.

11. The method of claim 7, wherein the extractive distillation column is operated at a temperature from about −40° C. to about 14° C.

* * * * *